United States Patent
Roussel

(10) Patent No.: US 9,694,534 B2
(45) Date of Patent: Jul. 4, 2017

(54) DEVICE FOR THERMOFORMING A PLASTIC FILM

(71) Applicant: Essilor International (Compagnie Generale D'Optique), Charenton-le-Pont (FR)

(72) Inventor: Eric Roussel, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 329 days.

(21) Appl. No.: 14/573,888

(22) Filed: Dec. 17, 2014

(65) Prior Publication Data

US 2015/0104534 A1 Apr. 16, 2015

Related U.S. Application Data

(63) Continuation of application No. 13/391,242, filed as application No. PCT/FR2010/051664 on Aug. 5, 2010, now Pat. No. 9,004,895.

(30) Foreign Application Priority Data

Aug. 24, 2009 (FR) ..................................... 09 55754

(51) Int. Cl.
| | |
|---|---|
| *B29C 51/42* | (2006.01) |
| *B29C 51/46* | (2006.01) |
| *B29C 51/08* | (2006.01) |
| *B29C 51/10* | (2006.01) |
| *B29C 51/16* | (2006.01) |
| *B29C 51/26* | (2006.01) |
| *B29L 11/00* | (2006.01) |
| *B29K 105/00* | (2006.01) |

(52) U.S. Cl.
CPC ............ *B29C 51/46* (2013.01); *B29C 51/424* (2013.01); *B29C 51/08* (2013.01); *B29C 51/10* (2013.01); *B29C 51/16* (2013.01); *B29C 51/262* (2013.01); *B29C 2791/006* (2013.01); *B29K 2105/256* (2013.01); *B29L 2011/0016* (2013.01)

(58) Field of Classification Search
CPC ...... B29C 51/08; B29C 51/262; B29C 51/424
See application file for complete search history.

(56) References Cited

U.S. PATENT DOCUMENTS

| | | | |
|---|---|---|---|
| 3,258,813 A | 7/1966 | Groth et al. | |
| 3,739,052 A * | 6/1973 | Ayres et al. | ............ B29C 43/16 220/62.22 |

(Continued)

FOREIGN PATENT DOCUMENTS

| | | |
|---|---|---|
| EP | 0 019 659 A1 | 12/1980 |
| FR | 2 256 014 | 7/1975 |

*Primary Examiner* — James Sanders
(74) *Attorney, Agent, or Firm* — Oblon, McClelland, Maier & Neustadt, L.L.P.

(57) ABSTRACT

A thermoforming device heats a plastic film to a substantially uniform temperature, in order to impart a curved shape to said film. The device includes a chamber, the internal pressure of which is variable and which is closed by the film, a system for measuring a sag in the film arranged outside the chamber and opposite said film, and a system for heating the film. The heating system includes a hot air blowing unit which is suitable for producing a hot airflow flowing parallel to the film between two opposite edges of said film.

12 Claims, 4 Drawing Sheets

(56) References Cited

U.S. PATENT DOCUMENTS

| | | | |
|---|---|---|---|
| 4,005,164 A | * | 1/1977 | Procter ................ B29C 45/561 |
| | | | 264/310 |
| 4,257,756 A | | 3/1981 | Gasson |
| 4,822,553 A | | 4/1989 | Marshall |
| 5,262,029 A | | 11/1993 | Erskine et al. |
| 5,709,825 A | | 1/1998 | Shih |
| 2002/0062161 A1 | | 5/2002 | Dusterhoft |
| 2008/0314499 A1 | | 12/2008 | Begon et al. |
| 2011/0146893 A1 | | 6/2011 | Marty et al. |

* cited by examiner

DEVICE FOR THERMOFORMING A PLASTIC FILM

BACKGROUND

Technical Field

The invention relates to a device for thermoforming a plastic film.

Description of the Related Art

It is known to preform a plastic film for application onto a curved surface of a substrate, in order to reduce the stresses produced in this film when it is subsequently assembled with the substrate. In this manner the film can be applied to the curved surface of the substrate without excessive stretching or folds, tears, crushing, or scratches being produced in the film by the tool used to apply it. To this purpose, the plastic film is preformed using a thermoforming device which may comprise:

- a chamber with variable internal pressure, which has an opening in a side of this chamber;
- an attachment system for attaching the film around the opening, which is adapted to hold a peripheral edge of the film firmly so that the film closes off and seals the chamber;
- a system for varying and controlling the pressure in the chamber;
- a measurement system for measuring a sag ("straight height") of the film which is held by the attachment system, this measurement system being arranged outside the chamber and facing the chamber opening; and
- a system for heating the film, adapted to heat the film held by the attachment system, and comprising a hot air blowing unit arranged to produce a stream of hot air flowing externally to the chamber and in contact with the film.

The film which is held by the attachment system is deformed, where it crosses the opening of the chamber, in a deformation which varies with the pressure that is created in the chamber. In this manner, the plastic film can be deformed while subjected to heat, with a deformation amplitude that is controlled while measuring the sag of the film in the opening of the chamber.

It is also known to place the substrate within the inside volume of the chamber, supporting it in a manner which is appropriate for controlling the approach of the substrate to the plastic film while the film is still being held in the opening of the chamber by the attachment system. Thus the thermoforming device also applies the film onto the substrate, which is particularly advantageous when compared to the number of manipulations of the film required to assemble the film and substrate together.

To provide sufficiently precise measurements of the film sag, the sag measurement system must be positioned substantially in alignment with the center of the chamber opening. For this reason, and when the inside volume of the chamber is already occupied by the substrate, this sag measurement system is placed outside the chamber.

In existing thermoforming devices of the type considered, the system for heating the film is also located outside the chamber, next to the film sag measurement system. This heating system commonly uses infrared radiation or blown hot air. The space that is then required, in the area outside the chamber in front of its opening, interferes with the heating of the film. The temperature of the heated film then varies between different points of said film. The deformation of the film produced by the thermoforming is then distributed in a manner which no longer corresponds to the desired shape. In particular, the distribution of this deformation is no longer rotationally invariant around an axis perpendicular to the side of the chamber which contains the opening, and which passes through the center of this opening. Certain of the defects mentioned above then reappear when a film preformed in this manner is applied onto the substrate, particularly when the substrate face is substantially spherical in shape.

In particular, such thermoforming devices are used to preform a plastic film that is intended to be applied onto an optical lens. The quality requirements of the final optical component are then particularly high, especially when it is a component such as a spectacle lens or a lens blank. For this type of application, the end product is rejected when stretching, folds, tears, crushing, or scratches in the film are visible to the naked eye. Thus for optical and ophthalmic applications in particular, the thermoforming devices currently in use are unsatisfactory.

BRIEF SUMMARY

One object of the invention therefore consists of providing a thermoforming device which does not have the above disadvantages and which is compatible with the quality requirements of optical or ophthalmic products.

To achieve this, the invention proposes an improvement to a thermoforming device as described above, in which the blowing unit is adapted so that the stream of hot air flows parallel to the plastic film from a first lateral side of the chamber opening to a second lateral side of this opening, said second side being opposite the first side.

Thus the hot air used to heat the plastic film can be brought to it from a lateral side of the chamber, which reduces the amount of space that is occupied outside the chamber in front of the opening. The film sag measurement system can then be properly arranged in this space in direct alignment with the film, to provide precise measurements of the film sag.

In addition, given that the stream of hot air flows parallel to the film between two lateral and opposite sides, the flow of this hot air can be particularly stable and have a constant distribution in contact with the plastic film. The temperature of the heated film is then more uniform, so that the thermoforming gives the film a deformation which is distributed in the desired manner. The subsequent application of the film onto the substrate no longer produces unacceptable defects in the end product, even when it is an optical or ophthalmic product such as a contact lens or spectacle lens.

Preferably, the thermoforming device is adapted so that the stream of hot air forms a laminar flow, without turbulence, parallel to and in contact with the film, between the first and second lateral sides of the chamber opening. Such a tangential laminar flow of the stream of hot air on the plastic film avoids the deformed plastic film being pushed by the stream of hot air towards the second lateral side. Thus the deformation of the film is distributed more isotropically around the central axis perpendicular to the opening.

The following improvements of the invention further improve the distribution of the stream of hot air on the film, and therefore the distribution of the deformation applied to the film by the thermoforming.

In a first improvement, the device may comprise a ring which extends around the chamber opening, outside said chamber, with a face that is slanted relative to a midplane of the opening, and a lower internal edge of this slanted face which is arranged to come in contact with or in proximity to the film held by the attachment system, along at least a portion of the peripheral edge of the film. The blowing unit is then arranged to produce the stream of hot air from an upper external edge of the slanted face, on the first lateral side of the chamber opening. Thus the stream of hot air is guided to or close to the plastic film by the slanted face of the ring, avoiding the presence of an area of stationary air in a recessed angle between the ring and the plastic film.

In a second improvement of the invention, the hot air blowing unit may comprise a nozzle which has a hot air outlet directed towards the chamber opening, on the first lateral side of the opening, and the nozzle may comprise a deflector with an oblique deflecting face, which is arranged to redirect the stream of hot air towards the film held by the attachment system. Thus the stream of hot air is also guided prior to its arrival onto the plastic film, in order to better establish a stable and laminar flow of said air.

When these two improvements of the invention are implemented together, the angle of the slanted face of the ring and the angle of the deflecting face may have a difference that is less than 20°, and preferably less than 10°, these two angles being measured relative to an axis which is perpendicular to the side of the chamber, and in a midplane of the opening which connects the two lateral sides. Thus the ring and the deflector together form a continuous and effective guide for the stream of hot air until it reaches the plastic film.

In a third improvement of the invention, the nozzle may comprise inner walls arranged longitudinally to partition the nozzle into separate channels which guide the hot air towards the nozzle outlet.

BRIEF DESCRIPTION OF THE SEVERAL VIEWS OF THE DRAWINGS

Other features and advantages of the invention will be apparent from the following description of a non-limiting example, with reference to the attached drawings in which.

DETAILED DESCRIPTION

For clarity, the dimensions of the elements represented in these figures are not necessarily in proportion to the actual dimensions, or to the relative proportions between the actual dimensions. In addition, the same references are used in the different figures to denote identical elements.

The invention is now described in detail in the context of an ophthalmic application, in which a plastic film is applied onto a blank for a spectacle lens. The lens blank may be of any type, of mineral, organic, or even a hybrid material. It has a diameter which is usually about 60 mm (millimeters), and a definitive face onto which the plastic film is to be applied. This face may be convex or concave. For the application of the film, the shape of the face of the lens blank can be compared to a portion of a sphere, even if it is a complex surface without an axis of symmetry, for example for a progressive lens. The plastic film may also be of any type, consisting of one or more materials which can be formed using heat. It may have any function, or multiple functions such as anti-reflective, anti-soiling, anti-scratch, anti-shock, anti-fogging, photochromatic, etc. Possibly the plastic film may have a complex, multilayer or cellular structure. In all cases, "film" is understood to mean the element which is initially flat and is intended to be preformed and then applied onto the lens blank, regardless of its internal structure.

Figure 1:
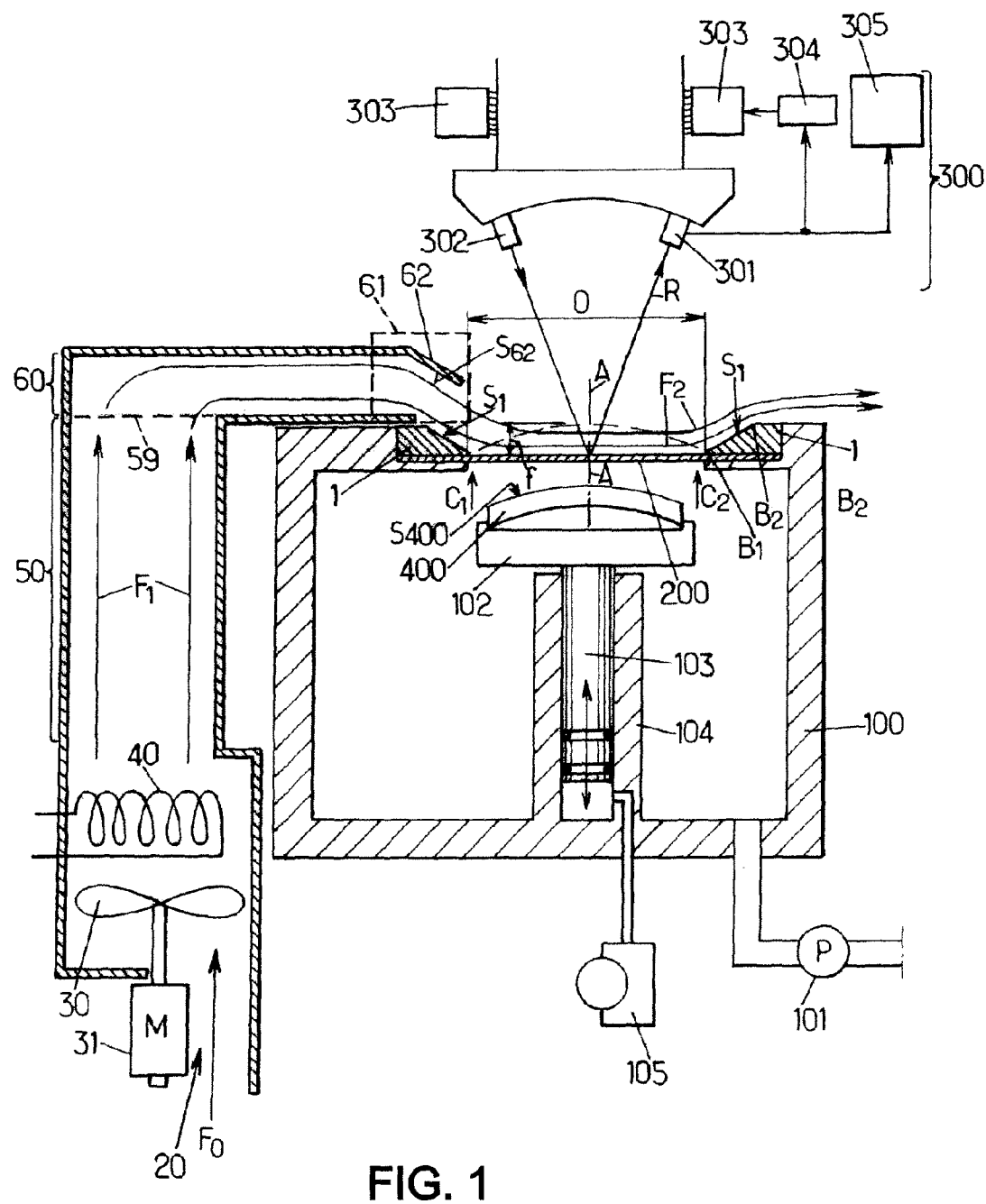
FIG. 1 is a general schematic view of a thermoforming device of the invention.
Figure 2A:
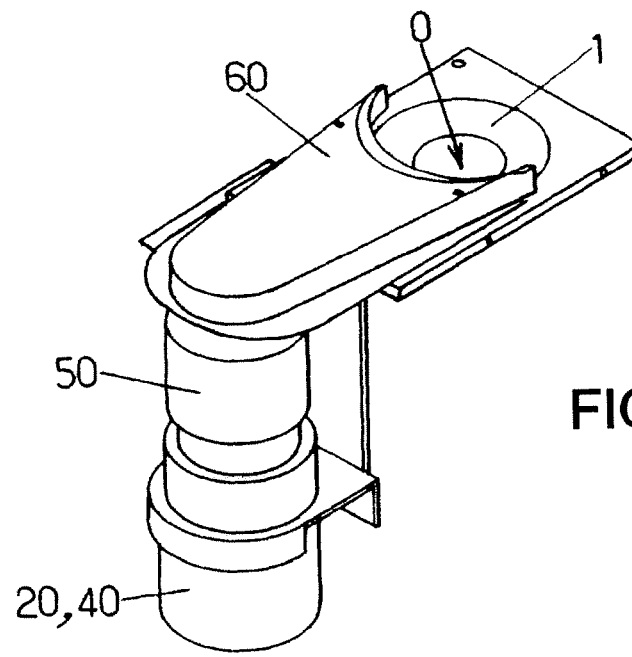
FIGS. 2a and 2b are more detailed perspective and side views of a portion of the thermoforming device of FIG. 1.
Figure 2B:
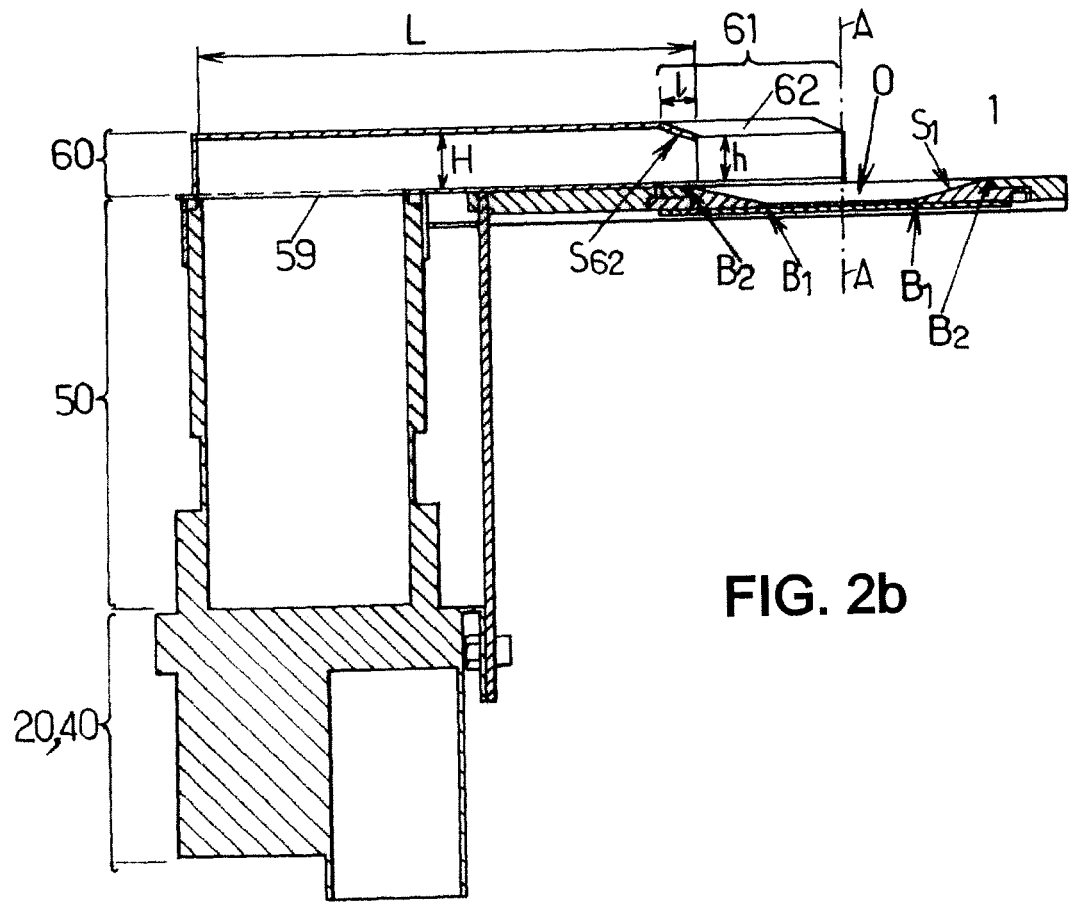

A plastic film thermoforming device of FIGS. 1, 2a, and 2b comprises:
- a chamber 100 with variable internal pressure, with an opening O which may be located in an upper side of the chamber;
- a system for attaching the plastic film 200 across the opening O, in a manner that closes off the opening O and forms a seal;
- a system for varying and controlling the pressure inside the chamber 100, which may consist of a pump 101, denoted P, and a pressure sensor which indicates the pressure inside the chamber 100, not represented,
- a system 300 for measuring a deformation of the plastic film 200 in the opening O; and
- a system for heating the film 200, consisting of a unit for producing and blowing hot air.

It is assumed in the following description that the chamber 100 is rotated so that the opening O is substantially horizontal and appears on the top of the chamber 100.

When the thermoforming device is also able to apply the film 200 onto the lens blank after this film has been preformed by thermoforming, the chamber 100 may additionally contain a holder 102 onto which the lens blank is placed. This latter is denoted by the reference 400 in FIG. 1. Advantageously, the lens blank 400 may be placed on the holder 102 so that the face $S_{400}$ of the blank onto which the film 200 is to be applied is facing the film 200. As an illustration, the face $S_{400}$ may be the convex face of the spectacle lens. Possibly, the holder 102 may be adapted to move the lens blank 400 towards the film 200, in particular to raise the blank until it comes into contact with the film 200. To this purpose, the holder 102 may have a piston 103 which can be raised in a controlled manner inside a cylinder 104, for example using hydraulic means 105.

The system for attaching the plastic film 200 in the opening O may be combined with one of the improvements of the invention, as will be described below.

As the film 200 is plastic, when it has been previously heated, it deforms across the opening O, towards the outside or towards the inside of the chamber 100 depending on whether the chamber has been brought by means of the pump 101 to a negative or positive pressure relative to the outside. The amplitude of this deformation can be characterized by the sag f of the film 200 at a central point of the opening O. This sag f is defined relative to the initial position of the film 200 before varying the pressure in the chamber 100. For most applications, the initial shape of the film 200 is flat.

The measurement system 300 which measures the deformation of the plastic film 200 is arranged above the center of the opening O, outside the chamber 100. In this position, it allows precise measurements of the sag f. The system 300 can comprise:
- a detection head 301, which is adapted for receiving a signal R from a central portion of the film 200 held by the attachment system;

a detection head 301 displacement system 303, which is adapted for moving the head 301 closer or further away relative to the central portion of the film 200;

a control system 304 for the displacement system 303, which is adapted for activating the system 303 in a manner that maintains a constant amplitude of the signal R received by the detection head 301; and a system 305 adapted for reading a position of the detection head 301.

Such a measurement system 303 can measure the sag f of the film 200 at any moment, particularly in a continuous manner, while the film is heated. It also allows measuring the sag f using a signal of a constant amplitude, when this signal is received by the detection head 301. The measurement of the sag f then corresponds to the displacement produced by the system 303. It is read on the system 305. Particularly precise measurements of the sag f can thus be obtained. The signal R received by the detection head 301 can be produced by a separate emitting head 302. In this case, the two heads, the emitting head 302 and detection head 301, are moved simultaneously by the system 303. Alternatively, depending on the measurement technology that is used, the detection head 301 may also have the emission function. Preferably, the system 300 makes use of the reflection of light or ultrasound. The signal R is then a light beam or an ultrasound beam that is reflected on the film 200.

The unit for producing and blowing hot air may comprise, depending on the direction of the air flow:

one or more apertures 20 for the intake of a stream of air $F_0$;

a system for accelerating the stream $F_0$, which may comprise a propeller 30 driven by a motor 31, and which produces an accelerated stream of air $F_1$;

a system for heating the air in the stream $F_1$, which may consist of a heating resistor 40;

a duct segment 50, which brings the stream of hot air $F_1$ to a nozzle 60; and the nozzle 60, which directs a stream of hot air $F_2$ issuing from the stream through an outlet 61 of the nozzle and in the direction of the plastic film 200.

The outlet 61 of the nozzle 60 is located on a lateral side $C_1$ of the opening O, outside the chamber 100, and is directed towards a side $C_2$ of the opening O, which is diametrically opposite the side $C_1$. In this manner, the stream of hot air $F_2$ passes above and in contact with all the film 200 which is exposed in the opening O.

The nozzle 60 has the additional function of giving a constant and laminar flow to the stream of hot air $F_2$, with a uniform flow distribution through the outlet 61. To this end, the nozzle 60 may advantageously have internal walls, which are arranged longitudinally in the stream of hot air $F_2$, and which partition the nozzle 60 into separate channels. Such internal partitions are denoted 63 in FIG. 3a.

Advantageously, to further improve the uniformity of the transverse distribution of the stream of hot air in the outlet 61, an additional distribution element 59 may be placed in the blowing unit, upstream from the nozzle 60. Such an element is adapted to produce a loss of air pressure in order to modify the distribution of the flow in the nozzle 60. The element 59 for distributing the stream of hot air may comprise in particular a grid, a perforated plate, or a compacted permeable block.

Figure 4A:
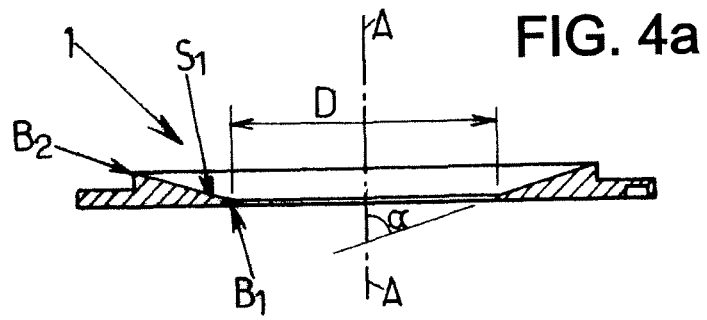
FIGS. 4a and 4b are cross-sectional and perspective views of a ring used in the thermoforming device of FIGS. 1, 2a and 2b.
Figure 4B:
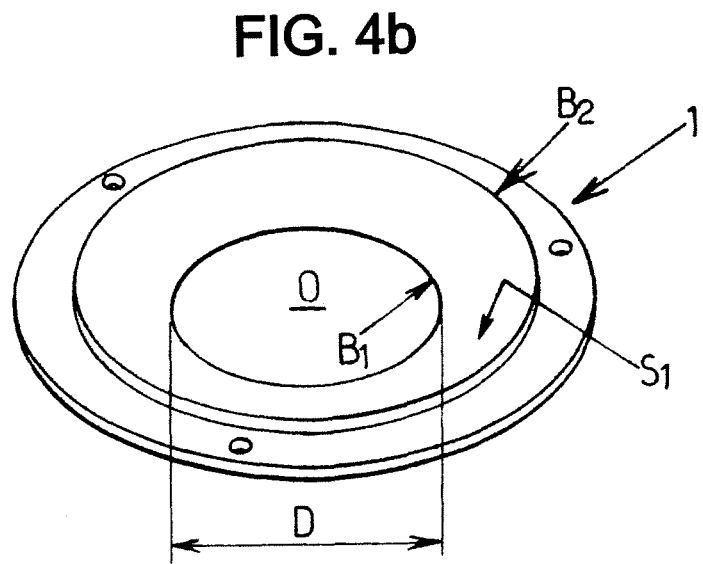

As shown in FIGS. 4a and 4b, the thermoforming device may advantageously comprise a ring 1 which surrounds the opening O of the enclosure 100, above the plastic film 200. Such a ring 1 may have an upper face $S_1$ which is slanted, relative to a midplane of the opening O, towards the center of this opening and towards the inside of the chamber 100. For example, the face 81 may be tapered and continuous around the opening O of the chamber 100. In this case, it has a rotational symmetry around an axis A-A perpendicular to the side of the chamber 100 which has the opening O, said axis passing through a center of this opening. This slanted face $S_1$ allows reducing, or even eliminating, a height difference between a lower edge of the outlet 61 of the nozzle 60 and the face of the plastic film 200 which is facing the outside of the chamber 100. Such a height difference would form a step likely to produce turbulence in the stream of hot air $F_2$ at the places where this streams comes in contact with the film 200 and where it leaves it, meaning at sides $C_1$ and $C_2$. Put another way, the slanted face $S_1$ guides the stream of hot air $F_2$ in the lower portion of the stream. To this purpose, the slanted face $S_1$ of the ring 1 has an lower internal edge B1 which is intended to come in contact with or near the film 200, and an upper external edge B2 which is intended to be near the outlet 61 of the nozzle 60. Preferably, the slanted face $S_1$ forms an angle α which is between 25° (degrees) and 90°, or better yet between 65° and 80°, relative to the axis A-A in the midplane of the opening O which connects the sides $C_1$ and $C_2$.

In a particularly advantageous embodiment of the invention, the ring 1 may additionally act as a clamp holding the film 200 onto the chamber 100. In this case, the ring 1 is part of the attachment system which attaches the film to the chamber, around the opening O. It then has the two functions of guiding the stream of hot air $F_2$ and attaching the film 200 to close off the chamber 100 and seal it. Alternatively, the ring 1 may only cover at least a part of the system for attaching the film 200 to the chamber 100 around the opening O.

Figure 3A:
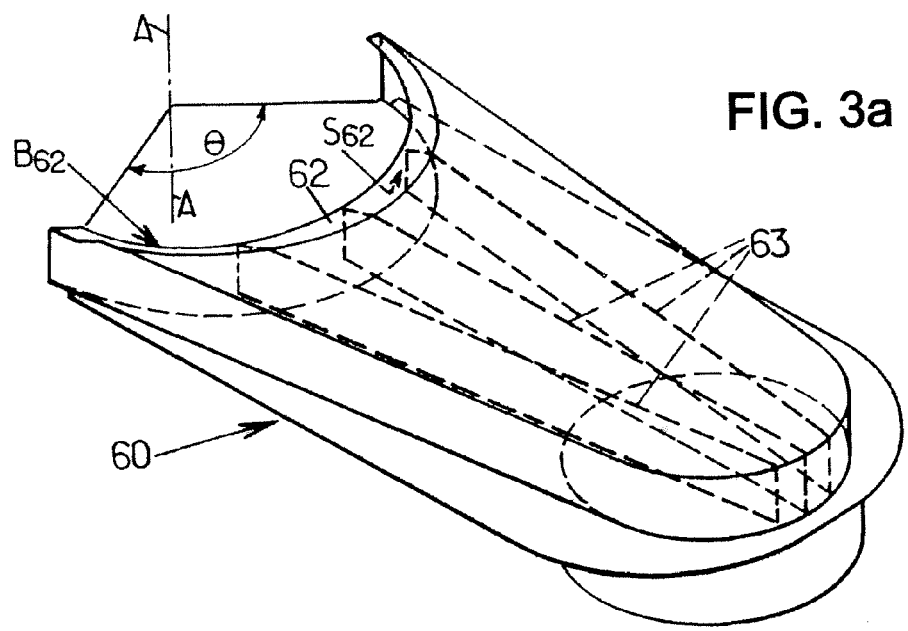
FIGS. 3a and 3b are respectively perspective and side views of a nozzle used in the thermoforming device of FIGS. 1, 2a and 2b.
Figure 3B:
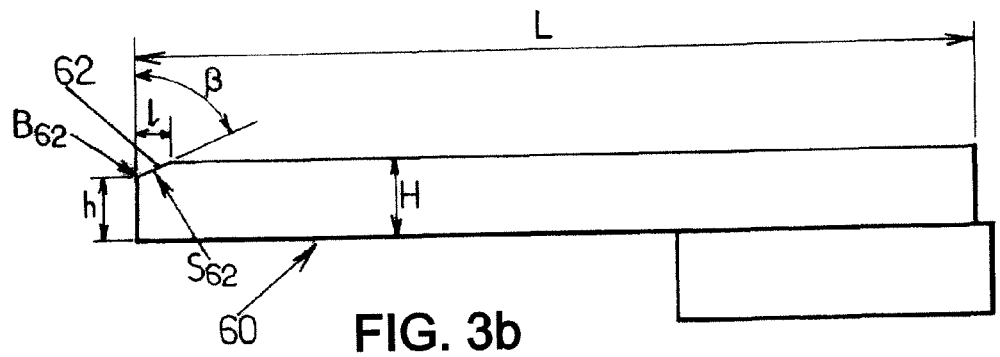
Figure 3C:
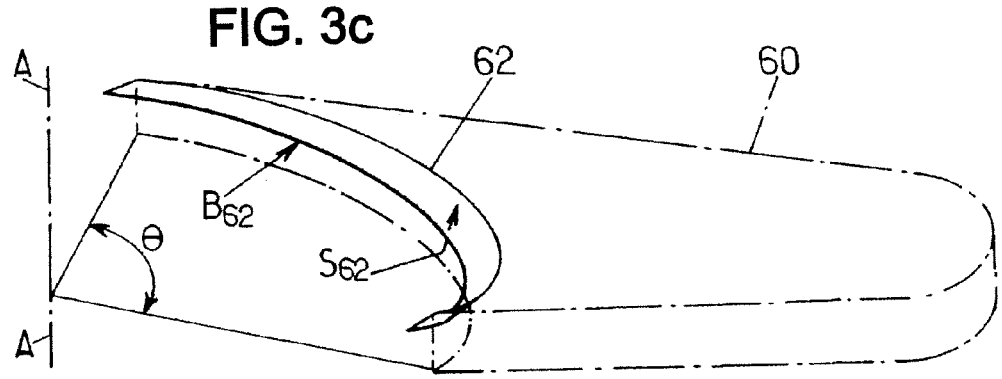
FIG. 3c is a perspective view of a deflector of the nozzle of FIGS. 3a and 3b.

With reference to FIGS. 3a to 3c, the nozzle 60 has a deflector 62 in its outlet 61. When the nozzle 60 is assembled with the chamber 100 equipped with the ring 1 (FIGS. 1, 2a and 2b), the deflector 62 guides the stream of hot air F2 in the upper portion of the stream, as the stream $F_2$ approaches the film 200. Thus the face $S_1$ of the ring 1 and the deflector 62 are complementary in guiding the stream $F_2$. The deflector 62 has a deflecting face $S_{62}$ which is in contact with the stream of hot air $F_2$, and which is slanted to redirect the stream $F_2$ towards the film 200. Preferably, this deflecting face $S_{62}$ is slanted at an angle β which is between 25° and 90°, or better yet between 60° and 75°, relative to the axis A-A, in the midplane of the opening which connects the sides $C_1$ and $C_2$.

Advantageously, the angle α of the slanted face $S_1$ of the ring 1, measured relative to the axis A-A, and the angle β of the deflecting face $S_{62}$ of the deflector 62, also measured relative to the axis A-A, have a difference which is less than 20°, and is preferably less than 10°. Thus the ring 1 and the deflector 62 together form a complete guide for the stream of hot air $F_2$, at the top and at the bottom, so that the stream $F_2$ has a laminar and stable flow.

Also, the deflecting face $S_{62}$ may advantageously have an end edge $B_{62}$ which extends substantially parallel to a portion of the peripheral edge of the opening O of the chamber 100.

When the film 200 is to be applied to the lens blank 400, the opening O may be circular with a diameter D of about 77 mm (FIGS. 4a and 4b). The outlet 61 of the nozzle 60 is near the peripheral edge of the opening O, and may follow this edge for an angular section θ of about 150° (FIGS. 3a and 3c). The slanted face $S_1$ of the ring 1 may be a cone of axis A-A having a half-angle at the apex α that is substantially equal to 72.5°.

The nozzle 60 may have a hot air inlet which is parallel to the plane of the opening O, and is circular with a radius of 31 mm for example. The hot air distribution element 59 may then be placed in this inlet of the nozzle 60. The length L of the nozzle 60 may be about 220 mm, in a central sectional plane of the nozzle (FIG. 3b). In addition, the nozzle 60 may be internally divided by three internal walls 63, forming four guide channels for the hot air which have substantially identical transverse cross-sections. The height H of the walls 63, measured parallel to the axis A-A and corresponding to the depth of the channels, may be equal to 25.5 mm, for example.

Lastly, the deflecting face $S_{62}$ may be a portion of a cylinder of radius 77.25 mm and having an axis of rotation sloped by the angle β relative to the axis A-A. For example, the angle β can be equal to 67.5°. The outlet 61 may have a height h of about 5.6 mm, and the deflecting face $S_{62}$ may have a length l of about 13.5 mm, measured in projection parallel to the plane of the opening O.

The hot air may travel in the nozzle 60 at a temperature which is substantially equal to 700° C. and at a flow rate which is between 400 and 700 l/min (liters per min). Under these conditions, the mean temperature of the heated film 200 may be about 140°, with the deviations from this mean value, at different locations in the opening O, being less than 10° C. or even less than 5° C.

Once the plastic film 200 is heated in this way, the pressure in the chamber 100 can be varied to preform the film, with real-time monitoring and controlling of the sag increase.

It is understood that the invention can be implemented by modifying some aspects of the embodiment described above, while maintaining at least some of the listed advantages. In particular, the numerical values which have been given, particularly the dimensions, are illustrative and can be modified according to the size of the plastic film to be thermoformed.

The invention claimed is:

1. A device for thermoforming a plastic film, comprising:
    a chamber configured to have variable internal pressure, and having an opening in a side of said chamber;
    an attachment system configured to attach the film around said opening, and hold a peripheral edge of the film firmly so that said film closes off and seals the chamber;
    a pressure control system configured to vary and control the pressure in the chamber, and cause the film held by the attachment system to deform in the chamber opening into a deformation which varies as a function of said pressure;
    a measurement system configured to measure a sag of the film held by the attachment system, said measurement system being arranged outside the chamber and facing the opening of said chamber;
    a heating system configured to heat said film held by the attachment system, and comprising a hot air blowing unit arranged to produce a stream of hot air flowing externally to the chamber and in contact with the film, wherein the blowing unit is configured to cause the stream of hot air to flow parallel to the film from a first lateral side of the opening of the chamber to a second lateral side of said opening, said second side being opposite said first side; and
    a ring extending around the opening of the chamber, outside said chamber, with a slanted face that is slanted relative to a midplane of the opening, and with a lower internal edge of said slanted face being arranged to come in contact with or in proximity to the film held by the attachment system, along at least a portion of the peripheral edge of said film, and with the blowing unit being arranged to produce the stream of hot air from an upper external edge of the slanted face, on the first lateral side of the chamber opening, wherein the slanted face of the ring forms an angle which is between 25° and 90° relative to an axis perpendicular to the side of the chamber, and in the midplane of the opening connecting the first and second lateral sides and wherein the slanted face of the ring is configured to guide the stream of hot air to or close to the plastic film, avoiding an area of stationary air in a recessed angle between the ring and the plastic film.

2. The device according to claim 1, wherein the blowing unit is configured to cause the stream of hot air to form a laminar flow parallel to and in contact with the film, between the first and the second lateral sides of the opening of the chamber.

3. The device according to claim 1, wherein the slanted face of the ring is tapered and continuous around the opening of the enclosure.

4. The device according to claim 1, wherein the ring is configured as a clamp holding the film onto the chamber, and is a part of the attachment system for said film or at least partially covers the attachment system for the film.

5. The device according to claim 1, wherein the hot air blowing unit comprises a nozzle having a hot air outlet directed towards the opening of the chamber, on the first lateral side of said opening, said nozzle comprising a deflector with an oblique deflecting face, arranged to redirect the stream of hot air towards the film held in place by the attachment system.

6. The device according to claim 5, wherein the deflecting face has an end edge which extends parallel to a portion of a peripheral edge of the opening of the chamber.

7. The device according to claim 5 wherein the angle of the slanted face of the ring, relative to the axis perpendicular to the side of the chamber differs by less than 20° from the angle of the deflecting face of the deflector relative to said axis.

8. The device according to claim 5, wherein the nozzle comprises internal walls arranged longitudinally to partition said nozzle into separate channels which guide the hot air towards the outlet.

9. The device according to claim 5, wherein the blowing unit additionally comprises a distribution element arranged upstream from the nozzle and configured to distribute the stream of hot air and modify the distribution of said stream in said nozzle by producing a loss of air pressure.

10. The device according to claim 9, wherein the element for distributing the stream of hot air comprises a grid, a perforated plate, or a compacted permeable block.

11. The device according to claim 1, wherein the measurement system is configured to use reflection of light or is configured to use ultrasound.

12. The device according to claim 1, wherein the measurement system comprises:
    a detection head configured to receive a signal from a central portion of the film held by the attachment system;
    a detection head displacement system configured to move said detection head closer or further away relative to the central portion of the film;

a control system configured to activate said displacement system in a manner that maintains a constant amplitude of the signal received by said detection head; and a reading system configured to read a position of the detection head.

* * * * *